Oct. 20, 1964  W. L. ABEL  3,153,288
EGG MEASURING APPARATUS
Filed March 18, 1960  5 Sheets-Sheet 1
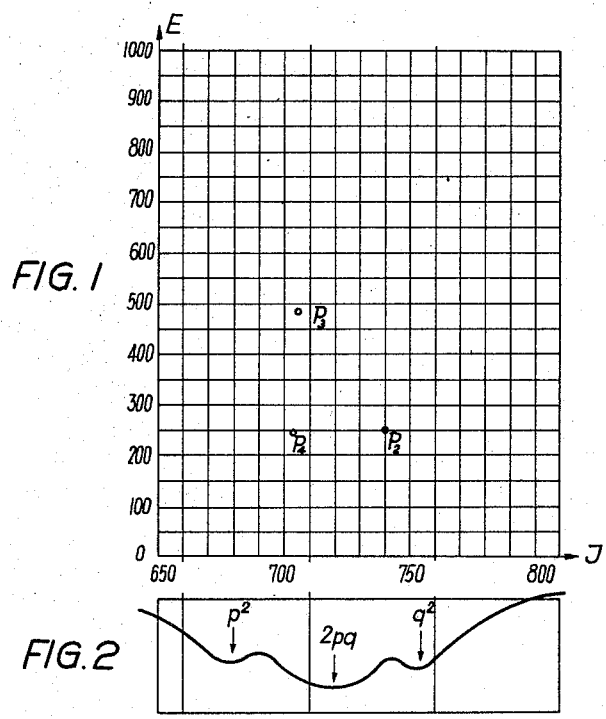
FIG. 1
FIG. 2
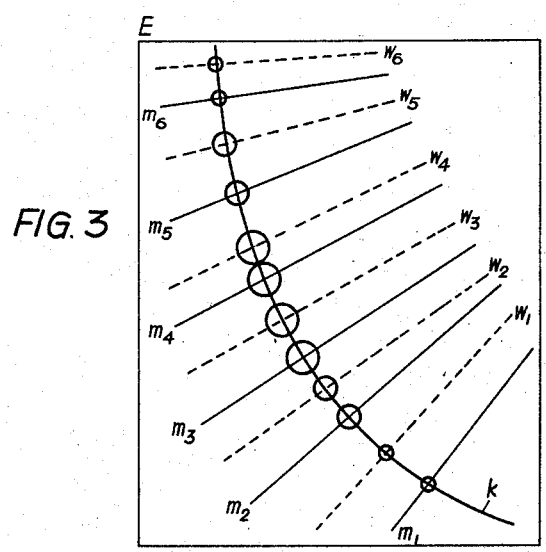
FIG. 3
Inventor
WOLFGANG L. ABEL
By Toulmin & Toulmin
Attorneys.

Oct. 20, 1964 W. L. ABEL 3,153,288
EGG MEASURING APPARATUS

Filed March 18, 1960 5 Sheets-Sheet 3

Inventor
WOLFGANG L. ABEL
By Toulmin & Toulmin
Attorneys

United States Patent Office
3,153,288
Patented Oct. 20, 1964

3,153,288
EGG MEASURING APPARATUS
Wolfgang L. Abel, Pichlgut, Loibichl
(Mondsee), Austria
Filed Mar. 18, 1960, Ser. No. 16,025
Claims priority, application Austria Mar. 23, 1959
6 Claims. (Cl. 33—174)

This invention relates to an apparatus for carrying out a method of sorting fresh eggs according to their biological properties, in which method at least two physically measurable properties of the eggs are determined and the eggs are then sorted with respect to combinations or functional derivatives of these measured values. Compared with the previously employed methods, in which only a single parameter is measured, this method has the advantage that latent properties of the unincubated eggs can be detected, which previously because apparent only after the eggs had been incubated.

It is an object of the present invention to establish features which are related to the value according to which the sorting is to be effected without requiring preliminary tests. This object is achieved in that at least three parameters which are in functional, form-dependent relation, or physical features which control such values, e.g., the yolk size, amount of white, pH values, or differences thereof are employed. This enables a direct evaluation of the latent properties as a basis for selection or elimination.

Parameters which have proved particularly suitable are the length of the egg, the largest diameter thereof and the eccentricity of the egg (distance of plane of largest diameter from the central plane parallel thereto). It is obvious that functional derivatives of these values may also be used.

The determination of the deviations from an ideal solid of revolution, which become apparent when the egg is being rotated, enables further conclusions regarding the existing hereditary factors.

Figure 4:
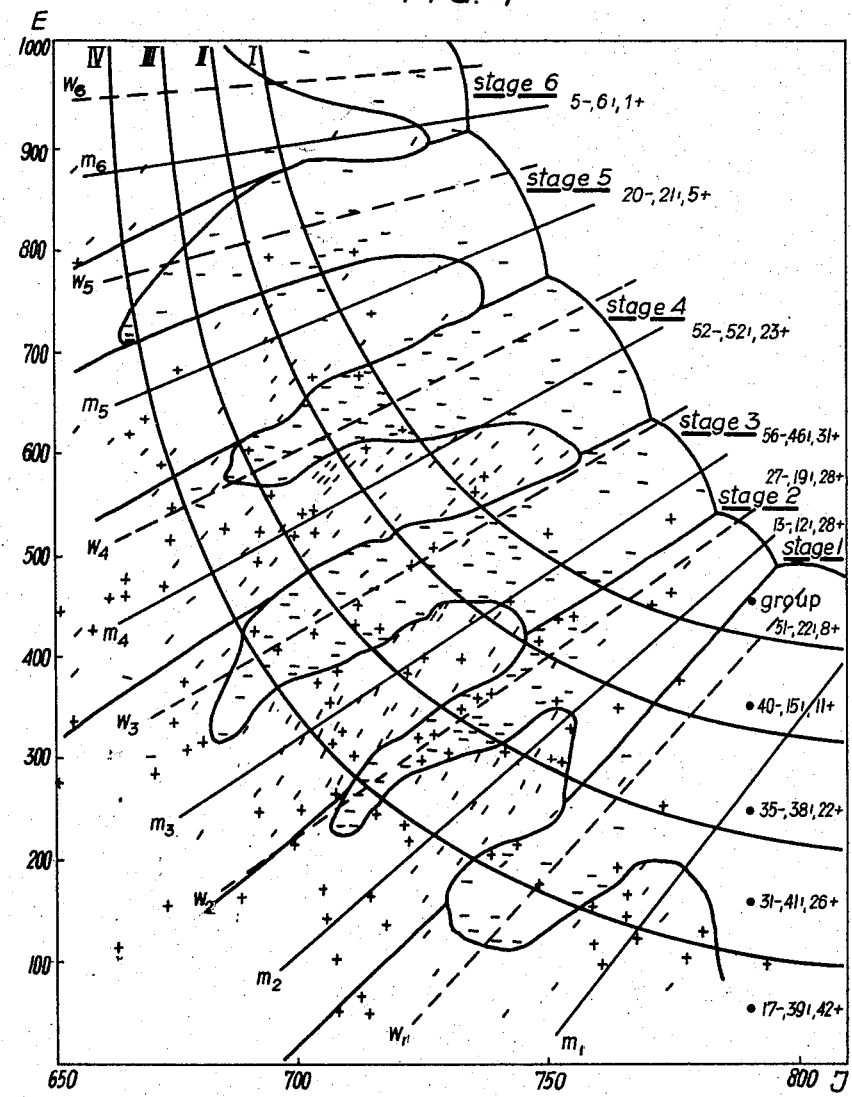
Figure 5:
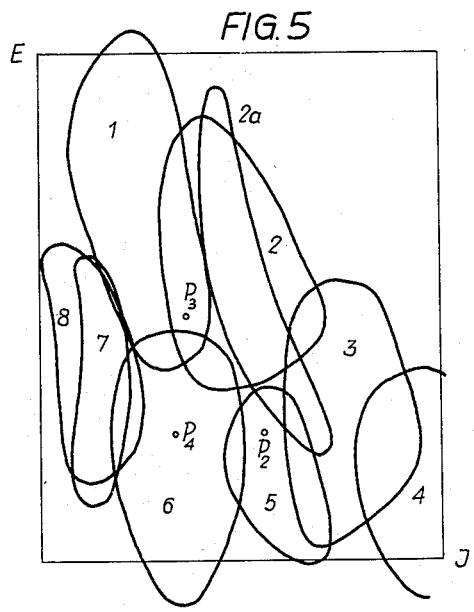
Figure 6:
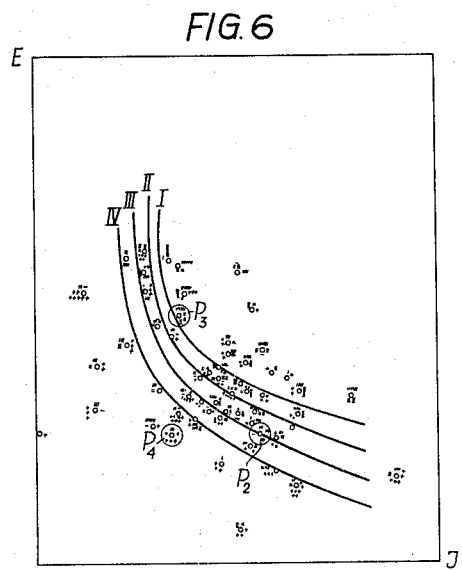
Figure 7:
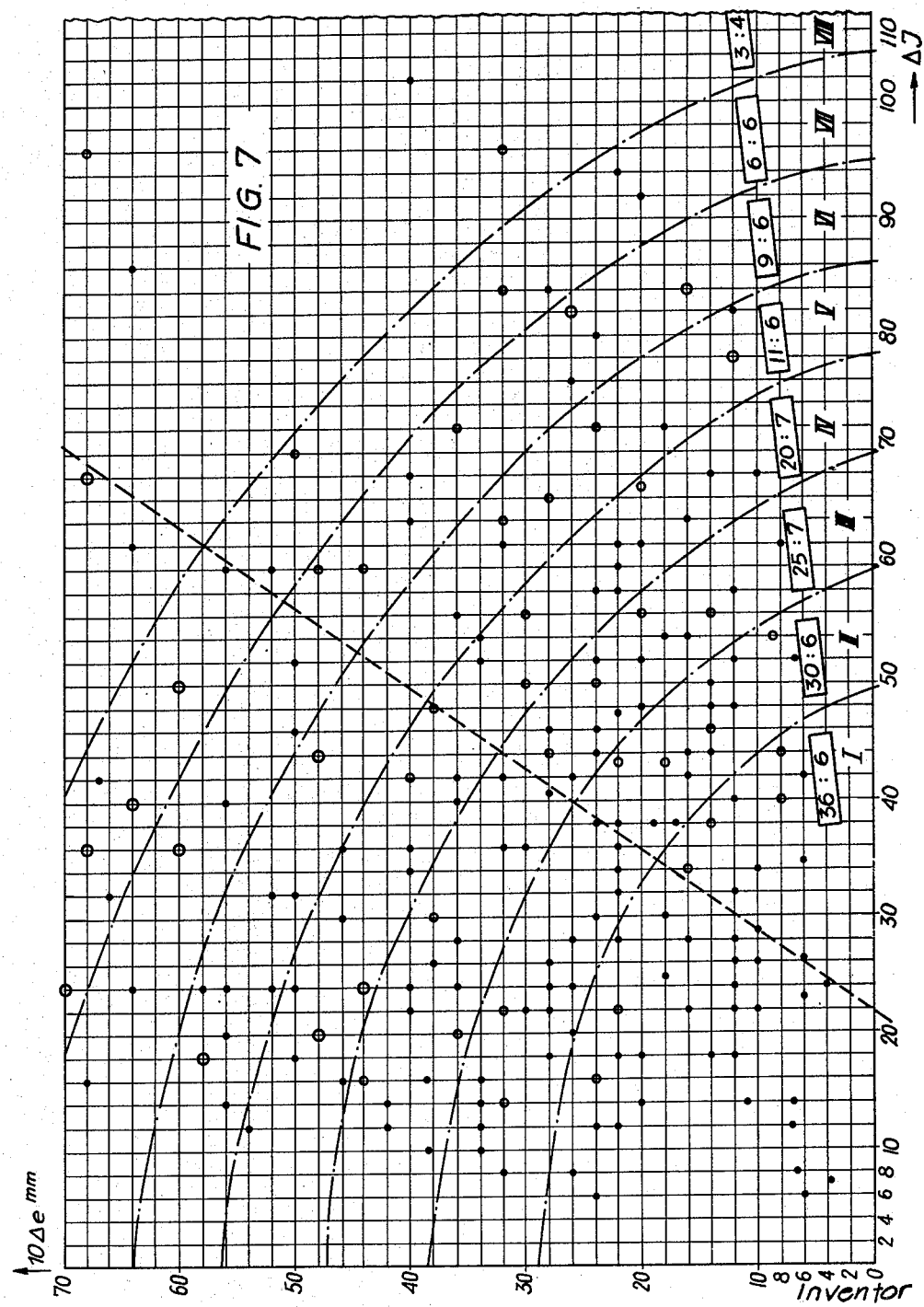
Figure 8:
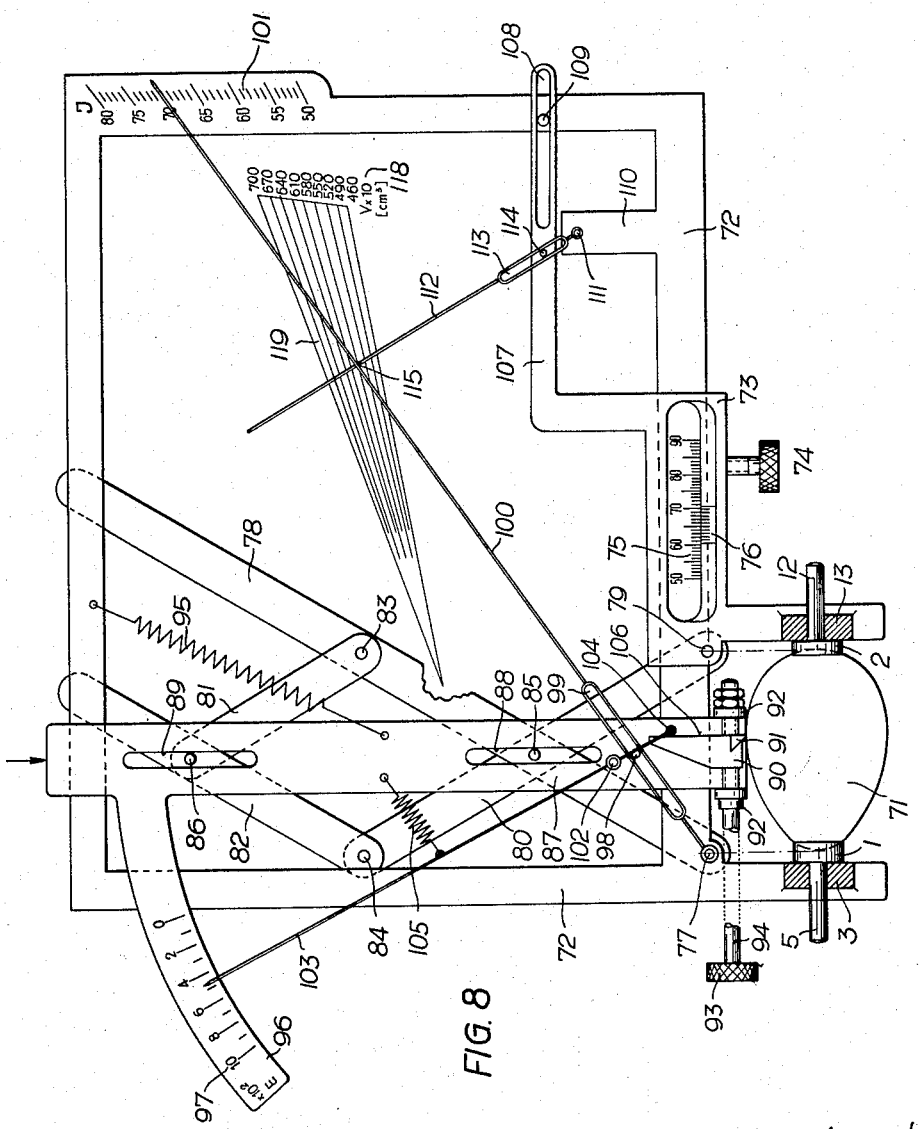

The invention will now be explained with reference to the drawings, of which FIGURES 1-7 are graphs which show how the eggs are measured and correlated with respect to various characteristics of the egg; and FIGURES 8 and 9 are sectional views of apparatus employed to measure and automatically record the properties of the egg.

The theoretical considerations, which have been proved by practical results, will be discussed with reference to FIGS. 1 to 7, FIGS 1-3, 5 and 6 being drawn to a reduced scale. If the plane of the largest diameter is drawn on an egg it will be found that in almost every egg the length $b$ of the rear section adjacent to the round end is smaller than the length $a$ of the section adjacent to the pointed end. The distance L of the transverse plane of the largest diameter from the transverse center plane will be referred as the eccentricity and is $$e = \frac{L}{2} - b$$

The ratio of the largest diameter D to the length L of the egg is $$i = \frac{D}{L}$$

In FIG. 1, which provides the basic sheet for all findings, multiples of these parameters are used as coordinates, namely, the value $I=1000i$ as the abscissa and the value $E=100e$ as the ordinate. The designations $P_2$, $P_3$, $P_4$ represent the mean value positions for eggs laid by individual hens.

FIG. 2 shows a frequency curve for rounder eggs on the right and for slenderer eggs on the left. This hereditary factor follows approximately a simple intermediary mode of inheritance. E.g., $p^2$ denotes slender, $q^2$ denotes round and $2pq$ denotes an intermediate group. If the frequency of $p$ and $q$ are equal, this will correspond to the frequency ratio 25:50:25 or the binomial $(p+q)^2$.

It has also been found that six sex stages can generally be distinguished in which these latent sex factors of the egg of the bird have frequencies corresponding to the binomial $(p+q)^5$.

In FIG. 3 using the same system of coordinates as in FIG. 1 the frequency of the male and female eggs of a flock in these six stages is diagrammatically shown. Close to the solid line curves the male stages $m_1, m_2, \ldots m_6$ are disposed whereas the female stages $w_1, w_2 \ldots w_6$ lies close to the dash line curves. Curve K is a line connecting the mean frequency values of the eggs having the same indices. It indicates also in a diagrammatical manner that on the left below it there are more eggs producing chicks of low vitality and on the right above it there are more active combinations of hereditary factors in the eggs. The shape of this curve indicates also the dependence of the combinations of the active and inactive properties in the egg on the index of the egg in such a manner that a wider egg having, e.g., an index $I=800$ and a smaller ordinate value of E is more valuable than a longer egg having, e.g., an index $I=650$ and the same ordinate value of E.

The frequency in the lowermost classes $m_1$ and $w_1$ and in the uppermost classes $m_6$ and $w_6$ is less than in the intermediate classes. The frequency of the eggs measured according to this method in the classes corresponds approximately to the binomial $(p+q)^5$ with the mean numerical expectation or probable expectation 1:5:10:10:5:1. This probability shown here and indicated by the size of the circles corresponds to a strain of fowl represented in FIG. 4.

FIG. 4 shows again in the same system of coordinates and diagrammatically the variation and distribution of about 500 eggs or egg hereditary factors of a flock, which after creeping were found to be unfertilized or arrested or male or female. The female eggs are indicated by a horizontal line, the male ones by an oblique line and the unfertilized, dead and arrested eggs with a cross. The greatest frequency of the male and female eggs which died after creeping is indicated by a wave-shaped line of separation. This indicates clearly six male stages and six female stages 1 to 6, which stages are intercalated and in which the sum of the eggs having viable hereditary factors corresponds approximately the binomial $(p+q)^5$. For a practical selection, empirical ranges can be found which are indicated by the lines of separation I–IV. In these ranges a lowering from the viable and female egg hereditary factors to bottom left to more male and lethal hereditary factors can be observed.

Just as the position of an egg in the coordinate ranges indicates the probable hereditary factor for male, female, viable or unviable individuals, the mean value of the plots of the eggs of a hen will indicate the hereditary factor to be associated with this hen to provide more female and viable or more male and more dead offspring. FIG. 5 shows again in the same system of coordinates in the bordered regions 1 to 8 variations of the eggs laid by different hens. In this figure variations 1 to 4 of valuable eggs are compared with less valuable eggs in the bordered regions 5 to 8. In this figure each bordering represents the extreme variation of the eggs associated with the respective hen. In practice the variation of the major part of the eggs of each hen is much smaller so that the position of the mean value can easily be determined from the respective bordering. The determination of the position of the mean value is the simpler the more purely bred is the flock or strain with respect to the hereditary factor. By way of examples the mean values for hens 2, 5 and 6 are indicated by small circles (points $P_3$, $P_2$ and $P_4$).

FIG. 6 indicates a number of mean value positions of individual hens. Each mean value (indicated by a circle) is provided with an indication of the numbers of crept male and female chicks and of the dead eggs which were eliminated during the incubation as being unfertilized, dying or arrested.

Whereas already a superficial consideration of the variation of a strain indicates that the hen mean values lying on top right on the outside must be associated with more valuable hens whereas the values lying toward bottom right correspond to the eggs of less valuable hens, the separating curves I to IV indicated in FIG. 6 provide a more exact distinction in accordance to the rating. This figure is based on the same system of coordinates. Depending on the desire of the breeder a selection based on these separating curves is possible, e.g., by using only those animals which are designated as group A above the uppermost line I in FIG. 6.

Thus hens the eggs of which has a high mean value position with respect to the separating curves correspond to a higher combination of hereditary factors in the binomial $(p+q)^5$, e.g., to the combinations $m_4$ to $m_6$ or $w_4$ to $w_6$ (see FIG. 3). It is obvious that similar separating curves which are more widely spaced will enable an evaluation of each egg based on hereditary factors, just as in the case of the mean value of the eggs from a hen, although with a lower probability. The smaller spacing of curves I to IV in FIG. 6 compared with FIG. 4 may be explained by the fact that in the former case the individual egg is evaluated whereas the evaluation of a hen is based on a mean value position, which involves a reduction of said variation. Another factor of selection resides in the symmetry relations of the egg itself.

Whereas it was previously believed that the shape of the egg depends substantially on the form of the cloaca or the laying intestine, a more exact investigation has shown that the form of the egg is an ideal ellipsoid or ovoid of rotation and that deviations from this ideal solid of revolution have profound causes. In FIG. 7 the largest deviations $\Delta e$ in the eccentricity of the egg observed when the same is rotated about its longitudinal axis, i.e., deviations of the position of the largest diameter D of the egg in the direction of the longitudinal axis, are plotted along the axis of ordinates. 10 units in the drawing correspond to 1 mm. deviation. The variation $\Delta I$ of the tabulated value I of the index observed when the egg is being rotated is plotted along the axis of abscissae. It is found that the expectation of life decreases with an increase of a rotation asymmetry of both values and increases with increasing rotation symmetry. For instance, if these deviations shown in FIG. 7 are divided by arcuate lines into several stages, stage I will be found to have an expectation of 36 viable to 6 dead eggs and the most highly asymmetrical stage VIII one of 3 viable to four dead eggs.

It is also found that a greater deviation of the eccentricity in conjunction with a smaller deviation of the largest radius indicates more male egg hereditary factors, and vice versa a stronger deviation in the radius and a smaller deviation of the eccentricity indicates more female hereditary factors.

For instance, if a line of separation is drawn in FIG. 7 at an angle of about 56° (dash line) an increasing probability of male hereditary factors will exist towards the left from this line and a high probability of female hereditary factors will exist on the right of this line. For the entire group a probability of about 60% male to 40% female hereditary factors will exist on the left of the line and a probability of about 60% female to 40% male hereditary factors on the right of this line.

Thus, conclusions as to the forces, processes and grouping of hereditary factors in the interior of the egg are possible not only from measurements of the symmetrical ovoid of revolution but also from deviations thereof (asymmetries) in different directions or along different axes. This provides entirely new and exact criteria of selection for the breeder.

Apparatus constructed in accordance with the invention is particularly suitable for determining the significant parameters of the egg.

FIG. 8 shows a mechanically operated apparatus for determining the individually measured values. It comprises two rotatable jaws 1 and 2. The left-hand jaw 1 serves for holding the pointed end of the egg whereas the round end is held by the right-hand jaw 2. The left-hand jaw is rotatable in a bearing by means of a pivot pin 5 affixed thereto. The pivot pin 12 of the right-hand jaw 2 is rotatably mounted in a bearing 13. The bearing 3 for the left-hand jaw is carried by a frame 72. The bearing 13 for the right-hand jaw is carried by a slide 73, which is slidably mounted in the frame 72 and can be fixed in position by a locking screw 74. The slide 73 carries a vernier 76, which coacts with a scale 75 on the frame 72. A link 78 forming a part of a pantograph is pivoted to the frame 72 at 77. A link 80 crossing the link 78 is pivoted to the slide at 79. Two additional links 81 and 82 which complete the pantograph are pivoted to the links 78 and 80, respectively, at 83 and 84, respectively. The two links 80 and 78 are interconnected by means of a pin 85. The upper ends of the links 81 and 82 are interconnected by means of a pin 86. Each of the pins 85 and 86 is movable in a groove 88 or 89, respectively, of a central slide 87 resting on the frame 72. The central slide 87 is provided at its lower end with a transversely displaceable measuring block 90. The latter carries a needle point 91 for an exact adjustment to the plane of the largest diameter of the egg 71 and is transversely displaceable by turning an adjusting knob 93. For this purpose the pin 94 of the adjusting knob is mounted on the central slide 87 for rotation in two bearings 92 but is nondisplaceable in its longitudinal direction and is provided in its central portion with a screw thread so as to be screwable in a correspondingly threaded hole in the measuring block 90. The central slide 87 is loaded by a coil spring 95 which tends to move it away from the egg.

The central slide carries on the left an arcuate scale member 96 provided with a scale 97 which serves for reading the tabulated value E of the egg to be measured.

A pointer 100 is also pivotally movable about the fulcrum 77 and is provided with a guide slot 99 in which a pin 98 carried by the central slide 87 is movable. The tip of the pointer 100 moves over a scale 101 provided on the frame to indicate the table value I of the index.

A pin 102 carried by the central slide 87 serves as a pivot for another pointer 103, which moves over the scale 97. This pointer 103 carries at its lower end a pin 104, which under the action of a coil spring 105 tending to move the pointer 103 in the clockwise sense bears on an abutment surface 106 of the measuring block 90.

The slide 73 carries a horizontal extension 107 having a slot 108, which moves over a pin 109 carried by the frame 72. Another pointer 112 is pivoted at 111 to a vertical extension 110 of the frame 72 and is provided with a guide slot 113, which embraces a pin 114 carried by the extension 107.

The crossing point 115 of pointers 100 and 112 lies on the bundle of radial lines 119 drawn on the frame 72 to represent equal volumes V as calculated from the equation $$V = D^2 \cdot L \cdot \pi / 6$$

The egg to be measured is engaged by the jaws 1 and 2 so that the pointed end is held by the jaw 1 and the round end by the jaw 2. After the screw 74 has been loosened the slide 73 is displaced to the left until the egg is gripped between the two jaws 1 and 2 without play. The slide 73 is then locked by tightening of the screw 74. The length L of the egg can now be read from the vernier 76.

The displacement of the slide 73 has pivotally moved the link 80 and displaced the central slide 87 by half the displacement of the slide 73 by means of the pantograph links 82, 81 and 78. As a result, the center of this slide is exactly over the center of the egg 71 to be measured.

Now the adjusting knob can be turned to set the needle point 91 to the plane of the largest diameter of the egg. By means of the abutment surface 106 and the pin 104 on the pointer 103 the latter is pivotally moved in accordance with the eccentricity e of the egg. The tabulated value E can be read from the scale 97.

By the movement of the pantograph 78, 80, 81 and 82 the pointer 100 pivoted to the link 78 at 77 has also been pivotally moved by the pin 98 moving in the guide slot 99 in accordance with the index i of the egg. The table value I can be read from the scale 101 at the tip of the pointer.

A displacement of the slide 73 causes by means of the pin 114 moving in the guide slot 113 a pivotal movement of the pointer 112 in accordance with the change in length. The volume V can now be read at the crossing-point of the two pointers 112 and 100 from the underlying bundle of equal volume lines.

Instead of drawing these equal volume lines on the base plate a corresponding scale could be provided on the frame 72 on the left of the scale 101. In this case another pointer could be pivoted to the base plate at the origin of the bundle of index straight lines and could be adjusted by hand to extend also through the crossing-point 115 of the pointers 112 and 100. The volume could then be read from the tip of this pointer.

In the following example the procedure for making such measurements is described in detail.

After the apparatus has been set up, the three pointers 100, 103 and 112 would be in the positions indicated in FIG. 8 if the egg has a length of 60 mm., a tabulated value of 480 for the eccentricity E and a tabulated value of 705 for I. The volume will then be indicated as about 55.1 cm.$^3$ by the crossing point 115.

The values of I and E are now carried into the basic chart on FIG. 1. In a similar manner fourteen more eggs, e.g. from the same hen, #1, are measured from FIG. 5 which will then give 14 more reference points, all of which will lie within the enclosed area for that hen. The middle position of these 15 individually measured values of I and E is then point $P_3$, which here happens to be the same as the point for the first egg.

In a similar manner the eggs of all the other hens of the same variety or flock are measured and the middle points determined, the points $P_2$ and $P_4$ for example being from two other hens. A number of such middle points will thus be obtained, from which by the use of cover sheets 4 to 6 it will be possible to learn various characteristics of these eggs and hens.

For example hen #1 with its middle point $P_3$ is shown in FIG. 6 to lie in the zone of line 1 while hen #6 with its middle point $P_4$ lies in the zone of line IV. Fifteen eggs from hen #1 may then be expected to produce 9 female and 6 male chickens, whereas hen #6 would be expected to produce only 3 male chickens and three dead or unhealthy ones. Hen #1 from zone I is therefore more valuable than the one from zone VI of this flock.

The symmetry of an egg is also a significant factor and can be measured by rotating the egg on its longitudinal axis while it is held between jaws 1 and 2 and observing the movements of pointer 100 which are then evaluated from FIG. 7.

In a similar manner as for one egg the biological value or hereditary factor and disposition for more active or inactive, probably dead or viable individuals having a higher expectation of producing a female or male chick, may be found for the hens of a strain or flock.

For use in the selection of hens based on the eggs laid by them (mean value of a plurality of eggs) the uppermost first group can be determined from the means of thousands of eggs or hens of different varieties, flocks and strains as having a probable expectation of 14% dead (unfructified, dying or arrested) eggs, 50% females and 36% males, and the fifth, lowermost group as having a probable expectation of 40% dead (unfructified, dying and arrested) eggs, 23% females and 37% males.

Of special significance for the breeder is the disposition for eggs which are dead or have lethal or low-vitality hereditary factors. This disposition can be statistically determined. The eggs which show no signs of life after an incubation, e.g., of five days are usually eliminated as "unfructified." The frequency of these eggs lies in the same measurable and determinable areas as those of low-vitality animals, which die later or while creeping out.

In other words: The hereditary factors of unfructified eggs in flocks which comprise cocks for fructifying and the low-vitality hereditary factors of eggs the chicks of which die after the 5th, 10th, 18th and 21st day differ only quantitatively, i.e., with respect to the time when their low vitality can be detected. This determination can now be obtained from physical features enabling it to be forecast and agrees with the experience that certain combinations of parent animals have hereditary factors without or with a lower or higher expectation of life or vitality and with the finding that each of a combination of parents yielding only lethal hereditary factors may produce viable hereditary factors in other combinations. It has previously been concluded therefrom that certain, still unknown causes for unviable or viable combinations must exist. This assumption has now been confirmed by the selection of the parent animals with reference to plots of physically measured values of their eggs so that a direct control is possible.

The above-mentioned division into group enables also a subdivision of eggs or hens into a multiplicity of combinations of hereditary factors or constitutional types and groups. E.g., a combination of the factors $(p+q)^2$ and of the factors $(p+q)^5$ with the combination male and female gives $3 \times 6 \times 2 = 36$ groups of hereditary factors which can be determined. By the incorporation of additional physically measurable properties or factors such as the weight, specific gravity, symmetry, size and/or form of yolk, viscosity of the yolk and/or white, pH value, a large number of hereditary factors and constitutional groups may be obtained. It is also found that the ideal egg is an ellipsoid of revolution or ovoid of revolution and that its symmetry relations as well as its asymmetry enable conclusions to specific properties, hereditary factors, forces and conditions etc. in the egg.

Whereas the breeder has previously been able to reach only some aims by time-consuming breeding that has taken many years, the method according to the invention opens up entirely new possibilities.

The specific mechanical apparatus that has been shown here in detail is just one of many other kinds of devices that could be used for making such measurements, and such devices need not be purely mechanical.

I claim:
1. An egg-measuring apparatus comprising a main supporting frame, a pair of concave gripping jaws mounted coaxially on said frame for rectilinear movement toward each other to engage the pointed and rounded ends respectively of an egg to support it against gravity, means for indicating the distance between the jaws, said jaws being also mounted for rotation about their common axis, means for indicating the position of the mid-point between the jaws on the frame, a member slidably mounted on the frame for movement toward or from the common axis of the jaws, a feeler transversely adjustable on said member in a direction parallel to the common axis of the jaws for locating the maximum transverse diameter of the egg, and means for indicating the eccentricity of the egg as the distance between said midpoint and the maximum transverse diameter of the egg.

2. The apparatus of claim 1, in combination with means actuated by rectilinear movement of one of the jaws for moving said member in the same direction a distance equal to half the distance through which the jaw is moved.

3. The apparatus of claim 2, in which the means that are actuated by the rectilinear movement of one of the jaws comprises a pantograph having one link pivoted to said movable jaw and another link pivoted to said frame, a slide movable in the central plane of the pantograph at right angles to the common axis of the jaws.

4. The apparatus of claim 3, in which the means for indicating the eccentricity of the egg comprises a pointer piovtally mounted on the slidably mounted member and actuated by the feeler.

5. The appartaus of claim 3, in combination with a pointer pivoted on the main supporting frame and actuated by the slidably mounted member for indicating the ratio of the diameter to the length of the egg.

6. The apparatus of claim 5, in combination with a pointer pivoted on the main supporting frame and actuated by movement of one of the jaws toward or from the other jaw to indicate the volume of the egg by the location of the point where it crosses the ratio-indicating pointer of claim 5.

References Cited in the file of this patent

UNITED STATES PATENTS

| | | |
|---|---|---|
| 1,029,386 | Mays | June 11, 1912 |
| 1,067,877 | Needham | July 22, 1913 |
| 2,789,693 | Harder | Apr. 23, 1957 |
| 2,852,852 | Byrkett et al. | Sept. 23, 1958 |
| 2,942,344 | Brannok | June 25, 1960 |

OTHER REFERENCES

Article from "Poultry Science," vol. 17, No. 4, July 1938, pp. 345–352, by F. B. Hutt.

Poultry Breeding, by M. A. Jull, published by Wiley & Sons, 2nd ed., 1940, "The Inheritance of Eggshape," pp. 356–358.